United States Patent [19]
Hollingsworth

[11] Patent Number: 6,134,495
[45] Date of Patent: Oct. 17, 2000

[54] THROTTLE RATE DESIRED ACCELERATION KICKDOWNS

[75] Inventor: Rita D Hollingsworth, Ortonville, Mich.

[73] Assignee: DaimlerChrysler Corporation, Auburn Hills, Mich.

[21] Appl. No.: 09/466,378

[22] Filed: Dec. 17, 1999

[51] Int. Cl.[7] .................................................. G06G 7/00
[52] U.S. Cl. ........................ 701/51; 701/66; 477/46; 477/124; 123/492; 123/490
[58] Field of Search .................. 701/51, 52, 56, 701/55, 66; 477/34, 46, 115, 120; 123/339.1, 339.13, 339.23, 492, 494

[56] References Cited

U.S. PATENT DOCUMENTS

| | | | |
|---|---|---|---|
| 4,369,676 | 1/1983 | Gaus | 74/868 |
| 4,391,165 | 7/1983 | Gaus | 74/869 |
| 4,576,065 | 3/1986 | Speranza et al. | 701/55 |
| 4,669,334 | 6/1987 | Miyaura et al. | 74/866 |
| 4,833,613 | 5/1989 | Mack et al. | 701/51 |
| 4,841,939 | 6/1989 | Sakamoto et al. | 123/494 |
| 4,849,896 | 7/1989 | Bürk et al. | 701/99 |
| 4,933,850 | 6/1990 | Wheeler | 701/56 |
| 5,083,480 | 1/1992 | Abo et al. | 74/866 |
| 5,605,519 | 2/1997 | Seidel et al. | 477/120 |
| 5,754,968 | 5/1998 | Hedström | 701/66 |
| 5,778,331 | 7/1998 | Leising et al. | 701/66 |
| 5,951,437 | 9/1999 | Yuasa et al. | 477/46 |

Primary Examiner—William A. Cuchlinski, Jr.
Assistant Examiner—Yonel Beaulieu

[57] ABSTRACT

A method is provided for controlling an automatic transmission. The method initially determines if a kick down gear change is required. If so, the method determines if the throttle rate is increasing. If the throttle rate is increasing, the method determines if the throttle rate is less than a pre-selected threshold. If the throttle rate is greater than or equal to the pre-selected threshold, the kick down gear change is performed at an aggressive rate. However, if the throttle rate is less than the pre-selected threshold, the kick down gear change is performed at a slower rate.

14 Claims, 1 Drawing Sheet

| Shift | Normal Acceleration | Normal Feather Acceleration | Smooth Acceleration | Smooth Feather Acceleration |
|---|---|---|---|---|
| 4-3 | 6600 | 6000 | 3800 | 1800 |
| 3-2 | 6000 | 5800 | 3600 | 1800 |
| Etc. | | | | |

THROTTLE RATE DESIRED ACCELERATION KICKDOWNS

BACKGROUND OF THE INVENTION

1. Technical Field

The present invention generally relates to methods of controlling automatic transmissions in automotive vehicles and, more particularly, to a method of controlling a kick down gear change in an automatic transmission.

2. Discussion

Most modern automotive vehicles are equipped with an automatic transmission. The automatic transmission includes a plurality of gears for providing different ratios between engine speed and tire rotation. Depending upon which gear ratio is selected, different acceleration is provided.

Under certain circumstances, an operator of an automotive vehicle may accelerate in such a manner that a gear change is required. This is known in the art as a "kick down". In a kick down situation, the vehicle transmission shifts from one operating gear to a lower operating gear. For example, a kick down may take a four speed transmission from fourth gear to third gear, from third gear to second gear, or from second gear to first gear.

Conventional kick down gear changes are performed independent of throttle rate. That is, the speed at which the automatic clutch is engaged to perform the gear change is constant regardless of how quickly the driver presses on the accelerator. As such, if a driver quickly steps into the accelerator, the rate at which the automatic clutch is engaged is the same as if the driver just gradually steps into the accelerator.

While such conventional kick down techniques are generally satisfactory, there is room for improvement in the art. For example, it has recently been discovered that when a driver aggressively steps into the accelerator, the driver is typically passing another vehicle or otherwise desiring quick acceleration. On the other hand, when a driver gradually steps into the accelerator, a normal speed adjustment is occurring wherein slower acceleration is acceptable.

Thus, it would be desirable to provide a technique for engaging the clutch and switching gears at different speeds based on the rate at which the driver steps into the accelerator. In this way, a quick and aggressive gear change can be provided under passing conditions and a slow and smooth gear change can be provided under non-passing conditions. By distinguishing the needs of the vehicle based on the driver's rate of stepping into the accelerator, greater control of vehicle performance can be achieved.

Accordingly, it is an object of the present invention to provide a method of controlling the rate of a gear change in an automatic transmission based on the throttle rate demanded by the driver.

SUMMARY OF THE INVENTION

The above and other objects are provided by a method of controlling an automatic transmission. The method initially determines if a kick down gear change is required. If so, the method determines if the throttle rate is increasing. If the throttle rate is increasing, the method determines if the throttle rate is less than a pre-selected threshold. If the throttle rate is greater than or equal to the pre-selected threshold, the kick down gear change is performed at a quick and aggressive rate. However, if the throttle rate is less than the pre-selected threshold, the kick down gear change is performed at a slower rate. Advantageously, the pre-selected threshold can be selected to correspond to the type of vehicle within which the present invention is incorporated. As such, a high performance vehicle may be provided with a threshold that more readily causes aggressive gear changes whereas a utility vehicle may be provided with a threshold that more readily causes slow and smooth gear changes.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 2:
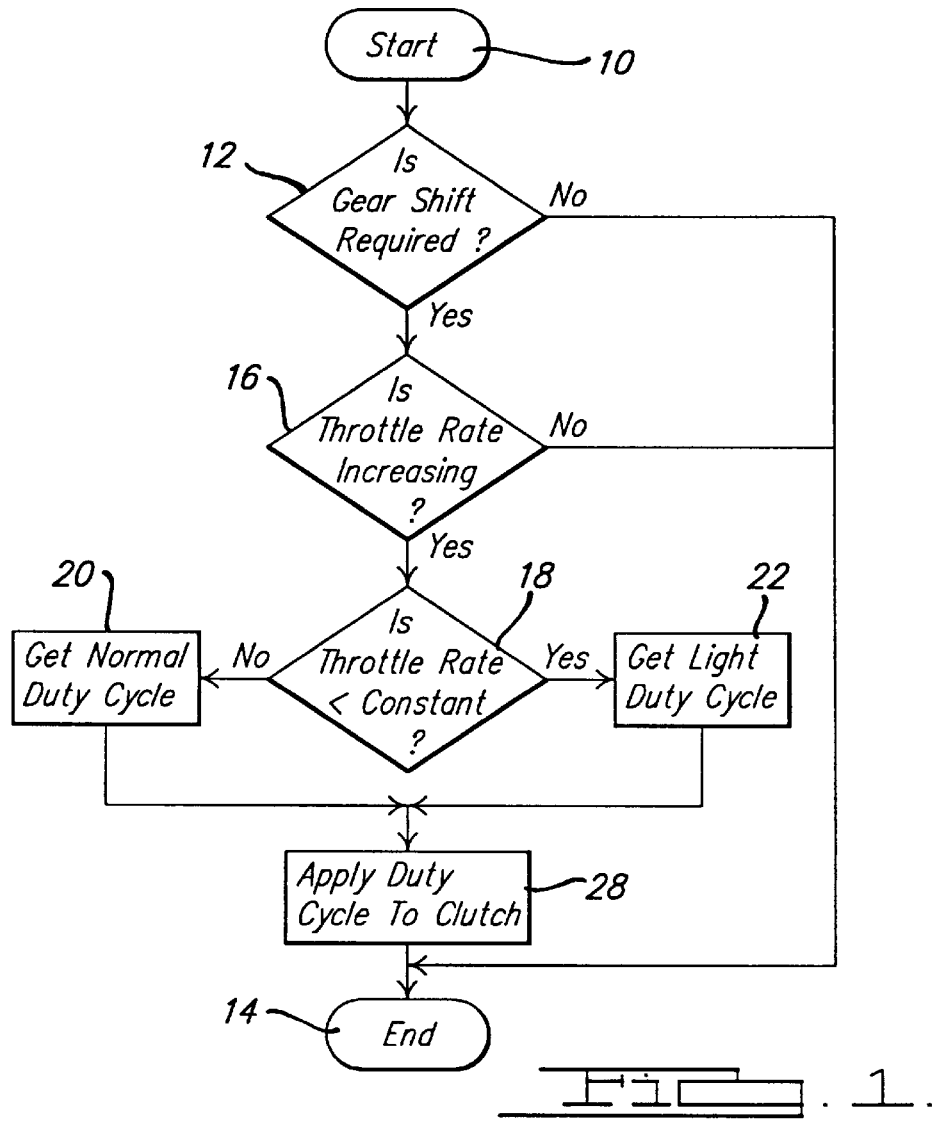
FIG. 1 is a flowchart illustrating the methodology of the present invention.
FIG. 2 is a table illustrating desired accelerations in correspondence with throttle rate.

The present invention is directed towards a method of controlling a kick down gear change in an automatic transmission of an automotive vehicle. According to the present invention, the rate at which the kick down gear change is performed corresponds to throttle rate. As such, if a driver aggressively steps into the accelerator, a quick and aggressive kick down gear change is performed. On the other hand, if the driver eases into the accelerator, a slow and smooth kick down gear change is performed.

Turning now to the drawing figures, FIG. 1 illustrates a methodology for performing a kick down gear change in accordance with the present invention. The methodology starts in bubble 10 and falls through to decision block 12. In decision block 12, the methodology determines if a kick down gear change is required. Such a kick down gear change would be required, for example, when a load on the vehicle is increasing with time or when the driver begins to accelerate by stepping into the accelerator.

If no kick down gear change is required at decision block 12, the methodology advances to bubble 14. In bubble 14 the method exits the subroutine pending a subsequent execution thereof. For example, the methodology loop can be executed every 7 ms. On the other hand, if a kick down gear change is required at decision block 12, the methodology continues to decision block 16.

In decision block 16, the methodology determines if the throttle rate is increasing. Preferably, this is accomplished by determining if the throttle rate has increased consecutively over a pre-selected period of time. For example, this may be established by determining if a current throttle rate is greater than a last throttle rate, determining if the last throttle rate is greater than a next to last throttle rate, and determining if the next to last throttle rate is greater than a second to last throttle rate. That is, is $R_c > R_{c-1} > R_{c-2} > R_{c-3}$, wherein $R_c$=current throttle rate. Throttle rate is preferably obtained by determining the difference between current throttle position and previous throttle position.

If the throttle rate is not increasing at decision block 16, the methodology advances from decision block 16 to bubble 14 and exits the subroutine pending a subsequent execution thereof. On the other hand, if the throttle rate is increasing at decision block 16, the methodology continues to decision block 18. In decision block 18, the methodology determines if the throttle rate is less than a pre-selected threshold value. Depending on the throttle rate, a different kick down gear change rate is required. For example, if the throttle rate is less than the pre-selected threshold, a first rate is required whereas if the throttle rate is greater than or equal to the pre-selected threshold, a second rate is required, the first rate being slower than the second rate. Preferably, the pre-selected threshold value is selected to correspond with the type of vehicle within which the present invention is installed. As such, a high performance vehicle can be provided with different operating parameters than a utility vehicle. A typical threshold value may be, for example, a 6° throttle position change in about 21 ms.

If the throttle rate is greater than or equal to the pre-selected threshold at decision block 18, the driver has aggressively stepped into the accelerator. As such, a quick and aggressive kick down gear change is required. Accordingly, if the throttle rate is greater than or equal to the pre-selected threshold at decision block 18, the methodology advances to block 20. In block 20, the methodology obtains a duty cycle for performing the kick down gear change at a "normal" rate. As will be appreciated, in the present methodology, a normal gear change rate is set to be equal to a quick and aggressive gear change rate, and a non-normal gear change rate is set to be equal to a slow and smooth gear change rate. Of course, these two conventions may be reversed if desired.

If the throttle rate is less than the pre-selected threshold at decision block 18, the driver has non-aggressively stepped into the accelerator. As such, a slow and smooth kick down gear change is required. Accordingly, if the throttle rate is less than the pre-selected threshold at the decision block 18, the methodology advances to block 22. In block 22, the methodology obtains a duty cycle for performing the kick down gear change at a slow and smooth rate.

Referring momentarily to FIG. 2, a table is provided for illustrating a preferred way of obtaining the first and second rate duty cycles. As illustrated, the methodology determines a desired acceleration based on the relationship of the throttle rate and the threshold as determined at decision block 18 of FIG. 1. A higher acceleration 24 is desired when the throttle rate is greater than or equal to the threshold and a lower acceleration 26 is desired when the throttle rate is less than the threshold. Each acceleration value also has a corresponding feathered acceleration rate which enables smoothing of gear changes as one skilled in the art will appreciate.

Depending on the nature of the throttle rate as compared to the threshold, a duty cycle is selected based on the desired acceleration for application to the automatic clutch. The duty cycle controls the speed at which the clutch is applied. As such, a quick and aggressive kick down gear change is performed when higher acceleration 24 is desired and a slow and smooth kick down gear change is performed when a lower acceleration 26 is desired.

Referring again to FIG. 1, after obtaining the appropriate duty cycle at blocks 20 and 22, the methodology advances to block 28. In block 28, the methodology applies the duty cycle to the clutch to effectuate the kick down gear change. After applying the duty cycle to the clutch at block 28, the methodology continues to bubble 14 and exits the subroutine pending a subsequent execution thereof.

Thus, a method is provided for performing kick down gear changes in automatic transmissions of motor vehicles. The method causes a faster gear change to occur if the driver aggressively steps into the accelerator and a slower gear change to occur if the driver eases into the accelerator. As such, the automotive vehicle responds more accurately to a driver's demands.

Being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling an automatic transmission comprising:

determining if a kick down gear change is required;

determining if a throttle rate is increasing if said kick down gear change is required;

determining if said throttle rate is less than a pre-selected threshold if said throttle rate is increasing;

performing said kick down gear change at a first rate if said throttle rate is less than said pre-selected threshold; and performing said kick down gear change at a second rate if said throttle rate is greater than or equal to said pre-selected threshold.

2. The method of claim 1 wherein said first rate is less than said second rate.

3. The method of claim 1 wherein said step of determining if said throttle rate is increasing further comprises:

determining if a current throttle rate is greater than a last throttle rate.

4. The method of claim 3 wherein said step of determining if said throttle rate is increasing further comprises:

determining if said last throttle rate is greater than a next to last throttle rate.

5. The method of claim 4 wherein said step of determining if said throttle rate is increasing further comprises:

determining if said next to last throttle rate is greater than a second to last throttle rate.

6. The method of claim 1 wherein said pre-selected threshold corresponds to a vehicle type in which said transmission is installed.

7. A method of controlling a kick down gear change in an automatic transmission of a motor vehicle comprising:

determining if a kick down gear change is required;

determining if a throttle rate is increasing if said kick down gear change is required;

looking up a desired gear change rate corresponding to said throttle rate; and performing said kick down gear change at said desired gear change rate.

8. The method of claim 7 wherein said desired gear change rate equals a first rate if said throttle rate is less than a pre-selected threshold.

9. The method of claim 8 wherein said pre-selected threshold corresponds to a vehicle type in which said transmission is installed.

10. The method of claim 8 wherein said desired gear change rate equals a second rate if said throttle rate is greater than or equal to said pre-selected threshold.

11. The method of claim 10 wherein said first rate is less than said second rate.

12. The method of claim 7 wherein said step of determining if said throttle rate is increasing further comprises:

determining if a current throttle rate is greater than a last throttle rate.

13. The method of claim 12 wherein said step of determining if said throttle rate is increasing further comprises:

determining if said last throttle rate is greater than a next to last throttle rate.

14. The method of claim 13 wherein said step of determining if said throttle rate is increasing further comprises:

determining if said next to last throttle rate is greater than a second to last throttle rate.

* * * * *